July 16, 1935.  D. N. BURRUSS, JR., ET AL  2,007,962
PROCESS OF MAKING CASEIN
Filed March 17, 1933   2 Sheets-Sheet 1
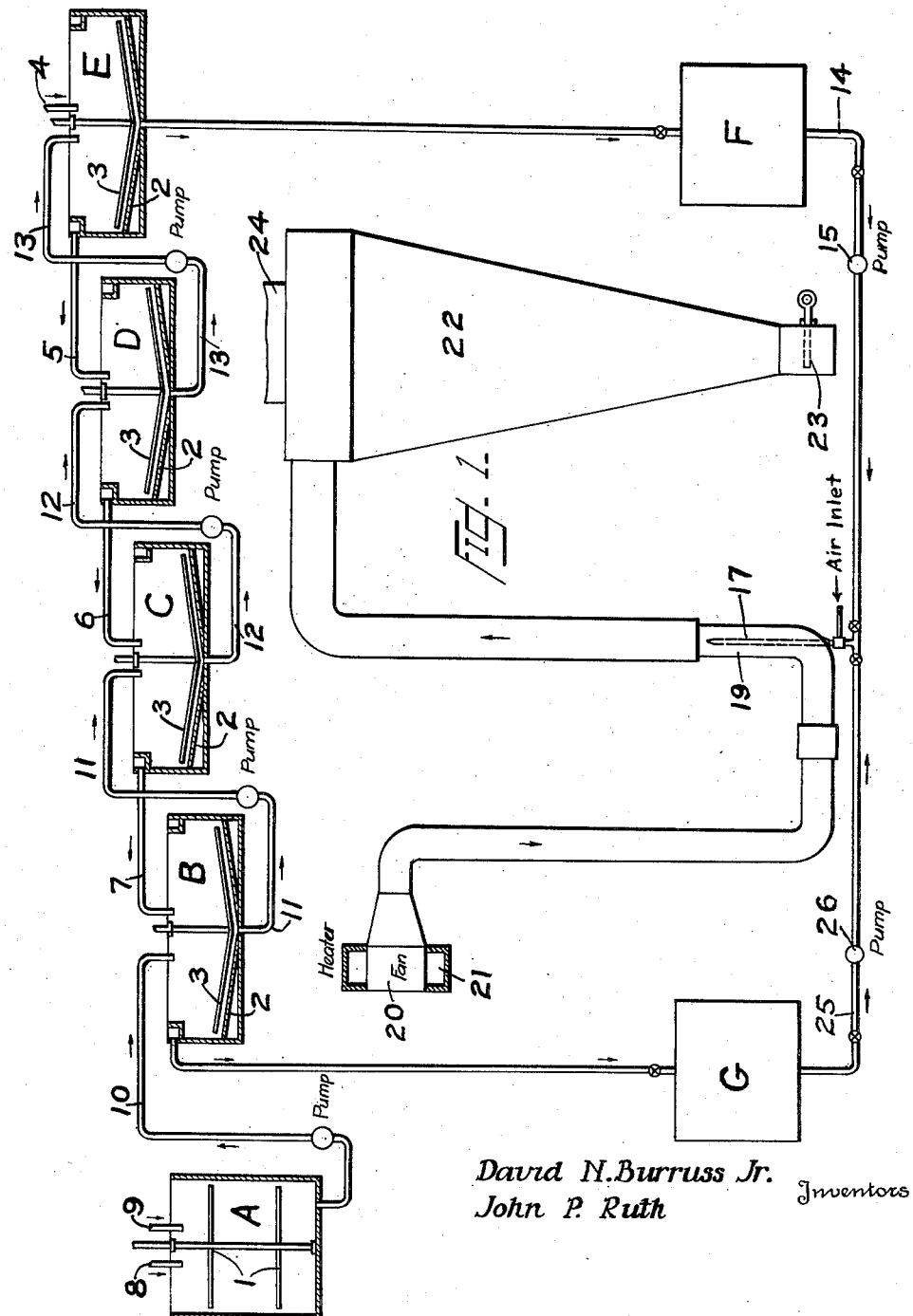
David N. Burruss Jr.
John P. Ruth   Inventors
By Chas. Silver
Attorney

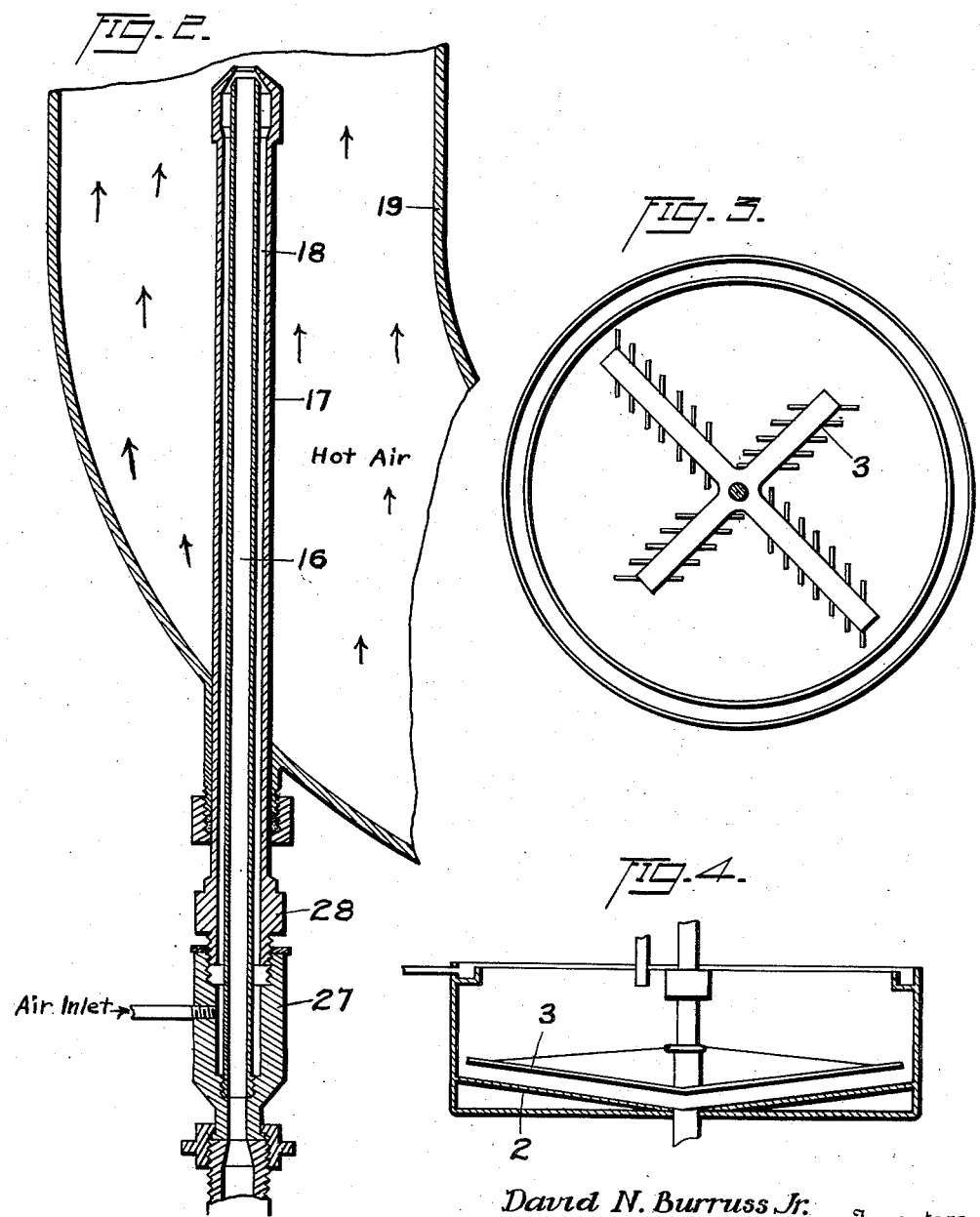

Patented July 16, 1935

2,007,962

UNITED STATES PATENT OFFICE 2,007,962

PROCESS OF MAKING CASEIN

David N. Burruss, Jr., St. Louis, Mo., and John P. Ruth, Collinsville, Ill., assignors to Chemical and Pigment Co., Inc., Collinsville, Ill., a corporation of Maryland Application March 17, 1933, Serial No. 661,407

3 Claims. (Cl. 99—11)

This invention relates to the manufacture of casein from vegetable matter and has particular reference to the production of casein from soya bean meal by a new and highly efficient process.

In the manufacture of casein from vegetable matter, such as soya bean meal, it is customary to operate with dilute dispersions of the meal in water, the concentration of the meal in water varying from one part of meal to 10 parts by weight of water to one part of meal and 20 parts of water. To these dilutions of meal and water are added various extracting agents. Since casein derived from either vegetable matter or milk is amphoteric, these extracting agents may be either acid or alkaline in character. The extreme dilutions involved in the processes heretofore employed for obtaining a suitable casein require proportionally larger amounts of the extracting agents than would be necessary if higher concentrations were used.

After the protein or casein has been converted to the soluble form in the processes heretofore used, the extraneous matter, such as cellulose, albumin, etc., is removed by either filtration or settling. The fairly clear liquid resulting from the filtration containing the soluble casein or protein is then reprecipitated by either acid or alkali, depending on whether an alkali or an acid was used for dissolving and extraction. If an alkali was used for extraction, the usual precipitant is either acetic, sulphuric or muriatic acid, although other acids may be used with varying results. If an acid is used for the extraction of the protein, an alkali such as ammonium hydroxide or soda ash is used for the precipitation. In either method, a very finely-divided, gelatinous, slimy, colloidal precipitate results which is very difficult to filter and is very sensitive to external conditions, such as temperature, bacterial fermentation, etc. As a consequence of these objectionable conditions involved in filtering and handling the precipitated casein, there has been great difficulty in producing a uniformly, high grade casein commercially that would be comparable in cost and quality to the higher grade milk casein products on the market.

Because of the great difficulties in carrying out this step of the operation, there have been many attempts to solve this problem, but these proved unsatisfactory. The failure to adequately overcome these objections has withheld successful economic production of vegetable casein and caseinates, particularly those derived from soya bean meal. For example, while caseinates of sodium and other metals, including calcium, barium, etc., have been known for a long time, not only has no economic process to date been evolved for commercial manufacture of these products but the equipment employed has also been inadequate and unsatisfactory for handling these products so as to dry them to a sufficient degree to render them stable to atmospheric conditions and overcome the effect of the sensitiveness of these products to bacterial decomposition while in a liquid dispersion or in a moist condition.

Among the objects of this invention is the provision of a process for producing vegetable casein which will overcome the disadvantages, difficulties and objections incident to the prior processes as heretofore stated. A further object of this invention is to provide a process of this character which, in addition to overcoming these disadvantages, difficulties and objections, is very much simplified, easier of operation, of greater efficiency and extremely more economical as to cost and reagents and materials used.

Other, further and more specific objects of this invention will become readily apparent to persons skilled in the art from a consideration of the following description when taken in conjunction with the accompanying drawings wherein:

Fig. 1 shows more or less diagrammatically a battery of extraction tanks operating on the counter-current principle in combination with a dryer used in our process for handling the washed but undried casein.

Fig. 2 is an enlarged fragmental detail view, partly in section, showing a suitable form of nozzle employed in the dryer.

Fig. 3 is a top plan view of one of the series of tanks shown in Fig. 1, employing a rake near the bottom for moving settled material.

Fig. 4 is a vertical section through one of the tanks having a rake near the bottom.

The apparatus for carrying out the novel process of this invention comprises a precipitating tank A and a plurality of tanks B, C, D and E, operating in series and forming a battery for conducting the process on the counter-current principle. Tank A is provided with a stirrer or agitator 1 for keeping material in suspension and thoroughouly agitated. The tanks B, C, D and E are preferably provided with downwardly sloping conical bottoms 2 which accommodate the rakes 3 positioned near the bottom of each tank, serving to agitate and remove settled material.

Water is introduced through the pipe 4 into tank E and the overflow from this tank passes through the pipe 5 into the top of tank D. In like manner, the overflow from tank D is brought to the top of tank C through the pipe 6 and the overflow from tank C is brought into the top of tank B through the pipe 7. If desired, the overflow from one tank may be pumped to the succeeding tank instead of depending upon gravity flow.

Sodium caseinate, in dry form or solution and prepared by any suitable manner, is introduced at 8 at the top of the tank A and the precipitating acid is also introduced at some suitable point 9 at the top of this tank. The acid, such as muriatic, sulphuric, acetic, etc. is preferably diluted and of such strength as will not break down the protein molecule. We normally employ a dilution of 1 part to 10 parts of water, but this can be further diluted to 20 parts of water for 1 part of acid. Sufficient water should be provided in tank A for dissolving the sodium caseinate if introduced in dry form. After the casein has been precipitated in tank A, the entire contents are transferred through the pipe 10 to the tank B. The casein is withdrawn from the bottom of this tank B through the pipe 11 in the form of a sludge and pumped into the top of tank C where the casein is again washed, and from this tank C the casein is again withdrawn at the bottom through the pipe 12 and pumped to the top of the tank D where a further washing takes place. The casein is in like manner withdrawn as a sludge from the bottom of tank D through the pipe 13 and pumped into the top of tank E.

After the final washing in tank E the casein in the form of a sludge is either delivered directly into the spray dryer or else passed into a supply tank F from which it is withdrawn as desired through the pipe 14 and forced by the positive flow pump 15 through the central passage 16 of the nozzle 17 while air under suitable pressure (from 5 to 70 pounds per square inch) is forced through the surrounding jacket 18. The aqueous dispersion of casein is thus sprayed into the hot air which is blown through the pipe 19 by means of the fan 20 surrounded by the heater 21. The casein is immediately dried and carried into the settling tank 22 where the dry casein falls to the bottom and is withdrawn by manipulation by the gate 23, while air which has become wet by abstracting water from the casein passes out through the top 24.

Precipitated casein is of a slimy, colloidal nature of extremely fine particle size that does not readily lend itself to any of the common forms of filtration. This difficulty of de-watering precipitated casein has been well recognized by those skilled in the art. In order to remove the water from the precipitate it has been necessary to resort either to the use of centrifuges or curd presses. Either of these methods are costly and inefficient owing to the time and labor involved and the losses sustained. Our process dispenses with filtration and eliminates the objections incident to the present method of filtration which avoids the losses sustained by these methods.

In the prior process employing simple tunnel or atmospheric dryers, after subjecting the precipitated casein to any of these unsatisfactory filtration processes, the material was exposed to a current of warm air for a long period of time while still in a more or less moist condition. This lengthy exposure to the oxygen of the air while in a moist condition causes the casein to darken and to form into hard horny masses necessitating the use of some form of grinding mill for breaking up the dried product. That part of the material which has been oxidized and has become horny remains in the ground finished product as an adultrant and thereby lowers and impairs the quality of the casein dried in such a manner. Also, in other methods heretofore employed for de-watering precipitated casein after filtration, for example, by the use of anhydrous water soluble solvents, the process is not only expensive but in most cases injurious to the finished product, due to the formation of addition product compounds with the casein.

All of these objectionable features incident to the filtration and drying in the prior processes are eliminated in our process, as we employ no costly or injurious, anhydrous, water soluble solvents for eliminating the water and we prevent oxidation and formation of horny masses by instantly drying the casein in a saturated atmosphere. With our process no grinding of the dried material is necessary, as the product is dried in a very finely divided form and the finished casein is finer than most casein produced by any of the other processes, all of which require the grinding of the dried material. Our casein is of uniform size and texture and is readily soluble in any of the common solvents for casein. The low cost and high efficiency of our process are predominant characteristics thereof.

By our new process we also eliminate the necessity of large quantities of water which is an item of great trouble and expense in a process of this kind, and we further eliminate the redissolving and reprecipitation steps which were very cumbersome and incident to prior processes and which heretofore have been the main difficulty in realizing a commercial soya bean product. Our process has so simplified operation as to make soya bean casein commercially available.

The sodium caseinate employed for this process is obtained by treating soya bean meal with an aqueous solution of an alkaline sodium salt or sodium hydroxide. Sodium sulphite has been found very satisfactory and yields a caseinate of little or negligible coloration. The corresponding compounds of potassium, ammonium and magnesium may be employed in lieu of the sodium compounds. We prefer to employ soya bean meal from which the greater part of the natural oily constituents have been removed. Our process, however, is applicable to soya bean meal and other casein-containing vegetable matter from which little or none of the oil has been extracted as well as other casein-containing vegetable matter from which the greater part of the natural oily constituents have been removed.

During the washing of the casein by the counter-current method, this material is passed from tank B to tank C, tank C to tank D and tank D to tank E, and as the overflow from tank E passes to tank D, the overflow from tank D to tank C and the overflow from tank C to tank B, the liquid in tank B contains the dissolved sugars, albumins and other proteids which are not precipitated by the acid. The overflow from tank B containing these materials may be passed into a supply tank G from which it is withdrawn as desired through the pipe 25 and forced by the positive flow pump 26 into the central passage 16 of the nozzle 17 while air under suitable pressure (5 to 70 pounds per square inch) is forced through the surrounding jacket 18. The solution containing the dissolved sugars, albumins, etc., is thus sprayed into the hot air which is blown through the pipe 19 by means of the fan 20 surrounded by the heater 21. The solid portion is immediately dried and carried into the settling chamber where it falls to the bottom and is withdrawn by manipulation of the gate 23 while the air which has become wet by abstracting water from the solution passes out through the top 24. The sugars, albumins and proteids are recovered in dried form for such uses as may be desired.

In the spray drying process which we employ, less air is required for spraying the solution containing the dissolved sugars, albumins, etc. than is required for the aqueous suspension of the casein. Due to the quantity of water contained in the solution, the rate of feed to the dryer is slower than when the suspensions are treated. This method of drying removes the water from the sugars, albumins, and other proteids without injuriously affecting the same. If it is desired to produce a casein of a very high degree of purity, the washed casein from tank E may be redissolved by an alkaline reagent and then reprecipitated by an acid. The latter precipitate is then passed through the series of tanks and subjected to counter-current washing, after which it is dried in the spray dryer.

In the drying operation, the air is heated to between 100° C. to 140° C. The temperature after the air has passed the nozzle of the spray may vary from 30° C. to 100° C. This temperature is governed by the percentage of moisture desired in the finished product and by the temperature to which the finished product may be heated without injury. Normally, the temperature of the air after passing the nozzle of the spray is from 55° C. to 70° C.

It will be seen by reference to Fig. 2 that the central passage 16 of the nozzle is of the same size and shape throughout its entire length and is therefore non-choking. We also dispense with the use of a jet or other nozzle at the spray end. The jacket 18 is threaded in the holder 27 and is adjustably movable therein by merely gripping this jacket 18 at 28 and turning. This permits regulation of the distance between the top of the central passage 16 and the top of the jacket 18, thereby providing a convenient means for regulating the spray. This regulation of the spray affords a very effective and highly desirable means for varying the physical characteristics of the dry product.

The present invention is not limited to the specific details set forth in the foregoing examples which should be construed as illustrative and not by way of limitation, and in view of the numerous modifications which may be affected therein without departing from the spirit and scope of this invention, it is desired that only such limitations be imposed as are indicated in the appended claims.

We claim as our invention

1. A process comprising precipitating casein in a slimy, colloidal nature of extremely fine particle size from an aqueous solution containing dissolved vegetable caseinate obtained from soya beans, subjecting this colloidal precipitated casein to a series of aqueous treatments wherein the undissolved portion after each treatment is subjected to the next treatment while aqueous liquid is passed from each treatment to the next treatment in a direction counter to the passage of said undissolved portion, and then spraying into a stream of hot air the aqueous sludge of casein resulting from the aqueous treatments.

2. A process comprising extracting soya bean meal with an aqueous alkaline solution, treating the resulting extract with an acid and precipitating casein therefrom in a slimy, colloidal nature of extremely fine particle size, subjecting this colloidal precipitated casein to a series of aqueous treatments wherein the undissolved portion after each treatment is subjected to the next treatment while aqueous liquid is passed from each treatment to the next treatment in a direction counter to the passage of said undissolved portion, and then spraying into a stream of hot air the aqueous sludge of casein resulting from the aqueous treatments.

3. A process comprising precipitating casein in a slimy, colloidal nature of extremely fine particle size from an aqueous solution containing dissolved vegetable caseinate obtained from soya beans, subjecting this colloidal precipitated casein to a series of aqueous treatments wherein the undissolved portion after each treatment is subjected to the next treatment while aqueous liquid is passed from each treatment to the next treatment in a direction counter to the passage of said undissolved portion, and then spraying into a stream of hot air a mixture of air and the aqueous sludge of casein resulting from the aqueous treatments.

DAVID N. BURRUSS, Jr.
JOHN P. RUTH.